(12) United States Patent
Umeyama

(10) Patent No.: US 10,187,603 B2
(45) Date of Patent: Jan. 22, 2019

(54) DISPLAY APPARATUS, AND CONTROL METHOD THEREOF

(71) Applicant: CANON KABUSHIKI KAISHA, Tokyo (JP)

(72) Inventor: Manabu Umeyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/626,923

(22) Filed: Jun. 19, 2017

(65) Prior Publication Data

US 2017/0372666 A1 Dec. 28, 2017

(30) Foreign Application Priority Data

Jun. 22, 2016 (JP) .................. 2016-123933

(51) Int. Cl.
| | |
|---|---|
| *H04N 5/775* | (2006.01) |
| *H04N 9/83* | (2006.01) |
| *H04N 5/57* | (2006.01) |
| *G09G 3/36* | (2006.01) |
| *H04N 5/765* | (2006.01) |
| *G09G 3/20* | (2006.01) |
| *G09G 3/34* | (2006.01) |

(52) U.S. Cl.
CPC ............. *H04N 5/57* (2013.01); *G09G 3/2092* (2013.01); *G09G 3/3426* (2013.01); *G09G 3/36* (2013.01); *H04N 5/765* (2013.01); *G09G 2320/0626* (2013.01); *G09G 2320/0653* (2013.01); *G09G 2320/0686* (2013.01); *G09G 2360/16* (2013.01)

(58) Field of Classification Search
CPC ................... G09G 3/3406; G09G 3/36; G09G 2320/0626; G09G 2320/0686; G09G 2360/16; H04N 5/57; H04N 5/765
USPC .................. 386/230, 239, 248, 307, 309
See application file for complete search history.

(56) References Cited

U.S. PATENT DOCUMENTS

2017/0039994 A1* 2/2017 Wu .................... G09G 5/10

FOREIGN PATENT DOCUMENTS

JP 2010-66714 A 3/2010

* cited by examiner

*Primary Examiner* — Robert Chevalier
(74) *Attorney, Agent, or Firm* — Canon U.S.A., Inc. IP Division

(57) ABSTRACT

A display apparatus according to the aspect of the embodiments includes a display unit configured to sequentially display a plurality of images based on a plurality of frames including a first frame and a second frame; and a control unit configured to control the display unit so as to display each frame with a display brightness according to a brightness of each frame, in which in a case that the second frame is to be subjected to predetermined image processing, the control unit controls the display unit such that an amount of change from a display brightness of the first frame to a display brightness of the second frame is not more than a predetermined threshold value.

13 Claims, 10 Drawing Sheets

FIG. 2

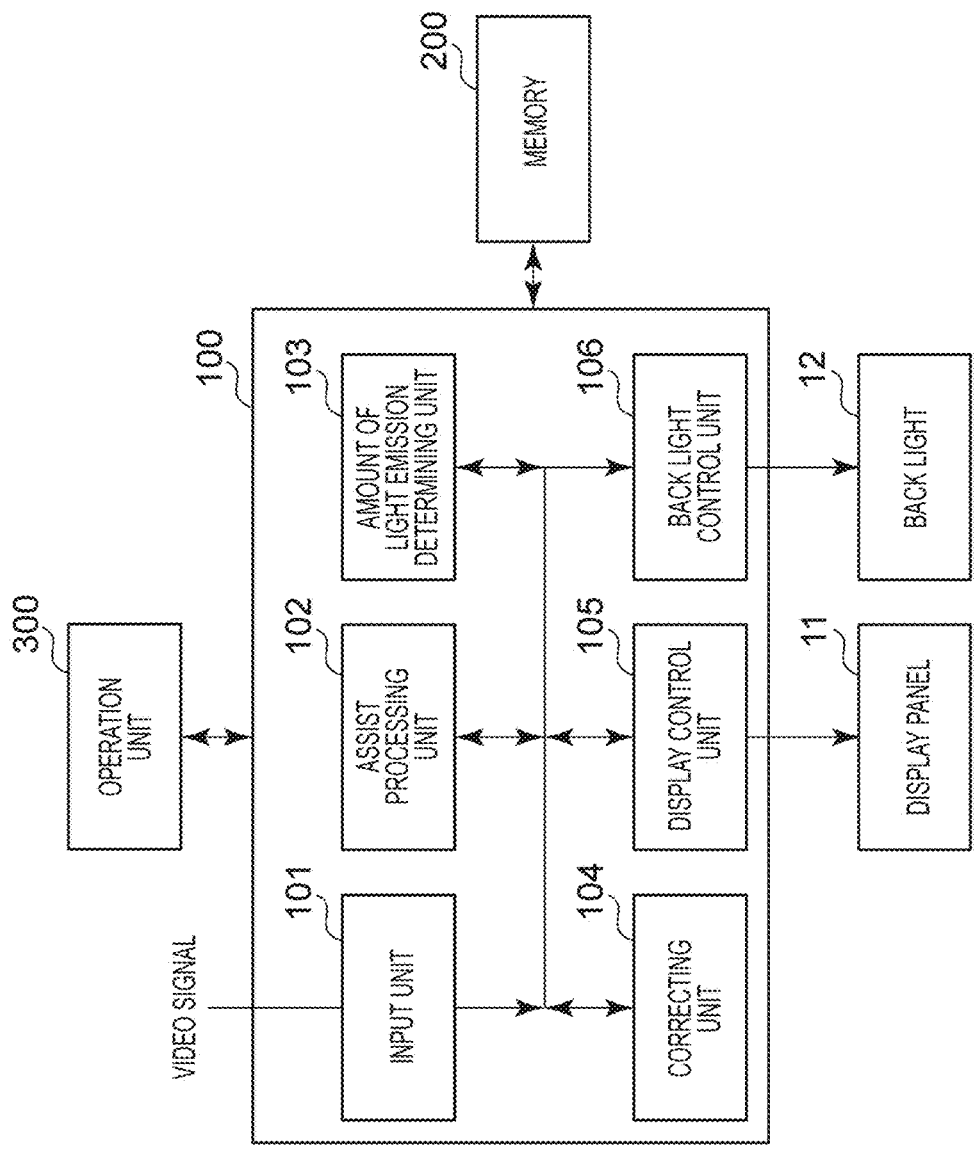

FIG. 7A

|   | 1 | 2 | 3 | 4 |
|---|---|---|---|---|
| A | 100% | 100% | 100% | 100% |
| B | 100% | 25% | 25% | 25% |
| C | 100% | 25% | 25% | 25% |

FIG. 7B

|   | 1 | 2 | 3 | 4 |
|---|---|---|---|---|
| A | 100% | 100% | 100% | 100% |
| B | 100% | 100% | 100% | 100% |
| C | 100% | 100% | 25% | 25% |

DISPLAY APPARATUS, AND CONTROL METHOD THEREOF

BACKGROUND OF THE INVENTION

Field of the Invention

The aspect of the embodiments relates to a display apparatus which displays an image, and a control method thereof.

Description of the Related Art

In recent years, there have been provided display apparatuses, such as a liquid crystal display and the like, which are capable of sequentially switching a plurality of successive frames to display an image with a display brightness according to a frame to be displayed. In a case of switching a plurality of successive frames and displaying the same, some of such display apparatuses control a change of a display brightness to be more moderate than a change of a brightness of a frame such that a temporal change of a display brightness of a screen is not abrupt.

The liquid crystal display apparatus recited in Japanese Patent Laid-Open No. 2010-66714 determines whether there is a scene change between a preceding frame and a succeeding frame or not in a case that there is a brightness change not less than a predetermined value between the preceding frame and the succeeding frame. In a case of determining that there is a scene change, the liquid crystal display apparatus recited in Japanese Patent Laid-Open No. 2010-66714 controls a brightness of a back light based on a brightness of the succeeding frame. Further, the liquid crystal display apparatus recited in Japanese Patent Laid-Open No. 2010-66714 discloses controlling an amount of change in a back light brightness between frames so as to prevent a display brightness from abruptly changing between a succeeding frame and a preceding frame in a case of determining that there is no scene change.

Additionally, a display apparatus (on-set monitor) for use in confirming, at a photographing spot or the like, an image photographed by an imaging apparatus, is demanded to display an image according to a brightness change of a subject in order to appropriately recognize a brightness change of the image photographed. On the other hand, for adjusting photographing conditions and an imaging apparatus, processing (assist processing) is conducted in some cases for confirming a state of an image such as enlarging processing, outline enhancement processing, or the like. The assist processing can be said to be image processing for a user to confirm a state of an image. In a case that an image subjected to such assist processing is displayed, a user is highly likely to draw near to a screen and carefully gaze at the screen in order to confirm a state of an image.

SUMMARY OF THE INVENTION

A display apparatus according to the aspect of the embodiments includes a display unit which sequentially displays a plurality of images based on a plurality of frames including a first frame and a second frame; and a control unit which controls the display unit so as to display each frame with a display brightness according to a brightness of each frame, in which in a case that the second frame is to be subjected to predetermined image processing, the control unit controls the display unit such that an amount of change from a display brightness of the first frame to a display brightness of the second frame is not more than a predetermined threshold value.

A control method of a display apparatus according to the aspect of the embodiments is a control method of a display apparatus which sequentially displays a plurality of images based on a plurality of frames including a first frame and a second frame, the method including displaying an image based on the second frame after displaying an image based on the first frame, and in a case that the second frame has been subjected to predetermined image processing, controlling the display apparatus such that an amount of change from a display brightness of the first frame to a display brightness of the second frame is not more than a predetermined threshold value.

Further features of the disclosure will become apparent from the following description of exemplary embodiments (with reference to the attached drawings).

BRIEF DESCRIPTION OF THE DRAWINGS

FIG. 2 is a schematic diagram showing arrangement of light emitting blocks in a case that a back light is viewed from the front.

FIG. 3 is a first block diagram showing a functional block diagram of the display apparatus.

FIGS. 7A and 7B are schematic diagrams showing an amount of light emission set value which is set based on an input frame or a processed frame, respectively.

DESCRIPTION OF THE EMBODIMENTS

In the following, exemplary embodiments of the disclosure will be described with reference to the drawings. A technical scope of the aspect of the embodiments is defined by a scope of claims for patent but not by examples illustrated in the following. Additionally, all the combinations described in the examples are not necessarily to the aspect of the embodiments. Recitations in the present specification and drawings are for illustrative purpose only and not to be construed as limiting the aspect of the embodiments. Various modifications (including combinations of the respective examples) can be devised based on the gist of the aspect of the embodiments and are not excluded from the scope of the aspect of the embodiments. Specifically, configurations of combinations of the respective examples and modifications thereof are construed to be included in the disclosure.

First Example

In the following, a display apparatus according to a First Example of the aspect of the embodiments will be described.

A display apparatus 1 according to the First Example of the aspect of the embodiments includes a display module 10 which displays an image on a screen, and a control unit 100 which controls the display module 10 so as to switch a plurality of frames (images) to display an image on the display module 10. Further, the control unit 100 determines whether a display frame among the plurality of frames has been subjected to predetermined image processing or not, the processing for a user to confirm a state of an image. The plural frames may be moving pictures each having an image content varying with each frame. Additionally, plural frames each including the same content based on a still picture may be input.

In a case that a display frame has been subjected to predetermined image processing, the control unit 100 determines whether a difference between a display brightness of a display frame on the display module 10 and a display brightness of a frame displayed before the display frame is larger than a predetermined threshold value or not. In a case that the difference between the display brightness of the display frame and the display brightness of the frame displayed before the display frame is larger than the predetermined threshold value, the control unit 100 controls the display module 10 such that the difference in the display brightness is not more than the predetermined threshold value.

Figure 1:
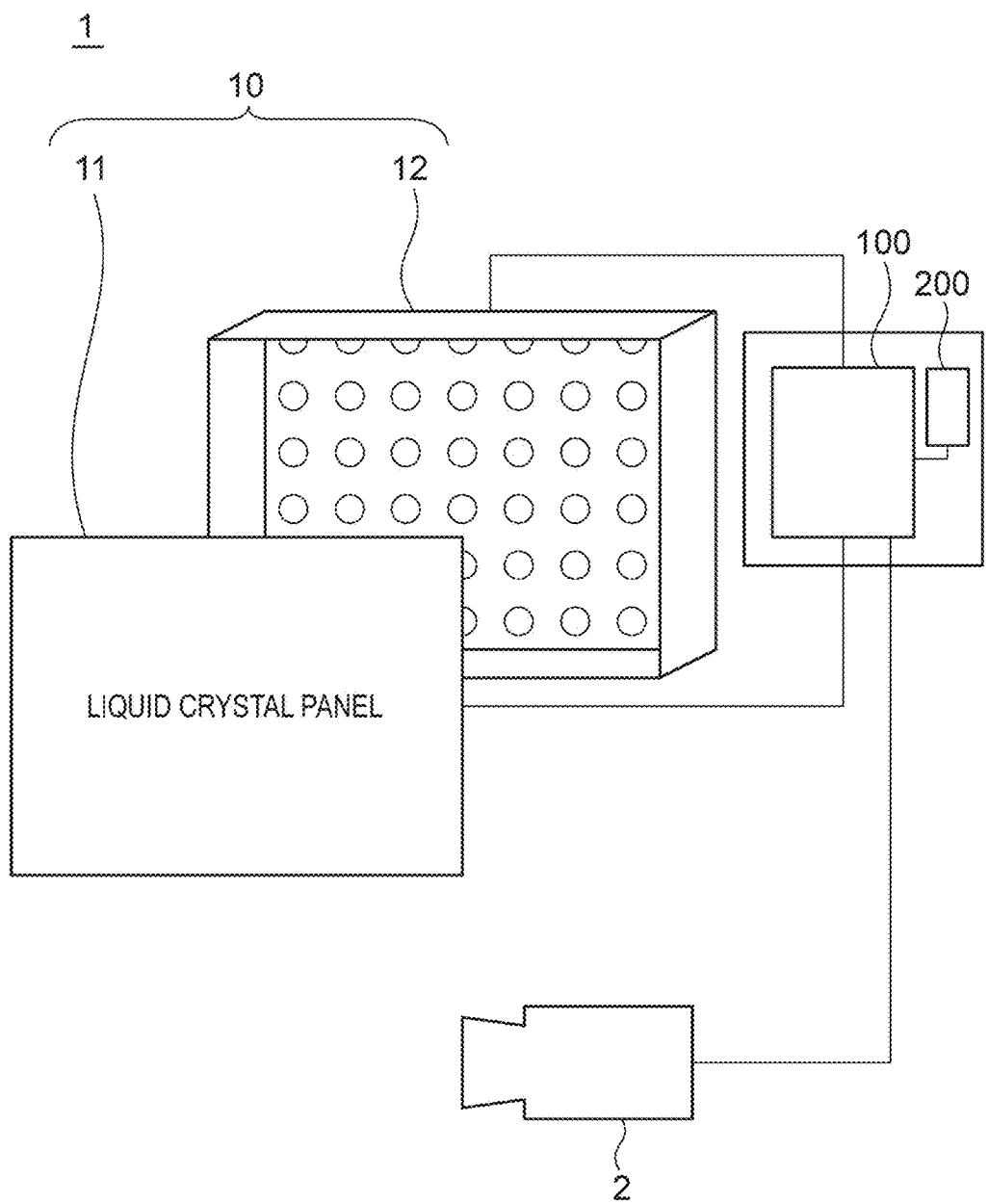
FIG. 1 is a view of an apparatus configuration of a display apparatus.

FIG. 1 is a view of an apparatus configuration of the display apparatus 1. The display apparatus 1 includes the display module 10, the control unit 100, a storage unit 200, and an operation unit 300. The display module 10 includes a display panel 11 and a back light 12.

The display panel 11 is a transmission type display panel which transmits a light radiated from the back light 12 to display an image. The display panel 11, which includes a plurality of transmission elements arranged in a matrix, is controlled by the control unit 100 based on a frame to be displayed. For example, the transmission element is assumed to be an element as a combination of a liquid crystal element and a color filter, and the display panel 11 is assumed to be a liquid crystal panel. The display panel 11 may be a transmission type display panel using an MEMS element as a transmission element.

The back light 12 is a lighting apparatus which radiates a light to the display panel 11. The back light 12 includes at least one light source. For example, the light source is a light source using an LED or a cold cathode tube. The back light 12 includes a plurality of light emitting blocks each with an amount of light emission that can be individually controlled.

Figure 2:
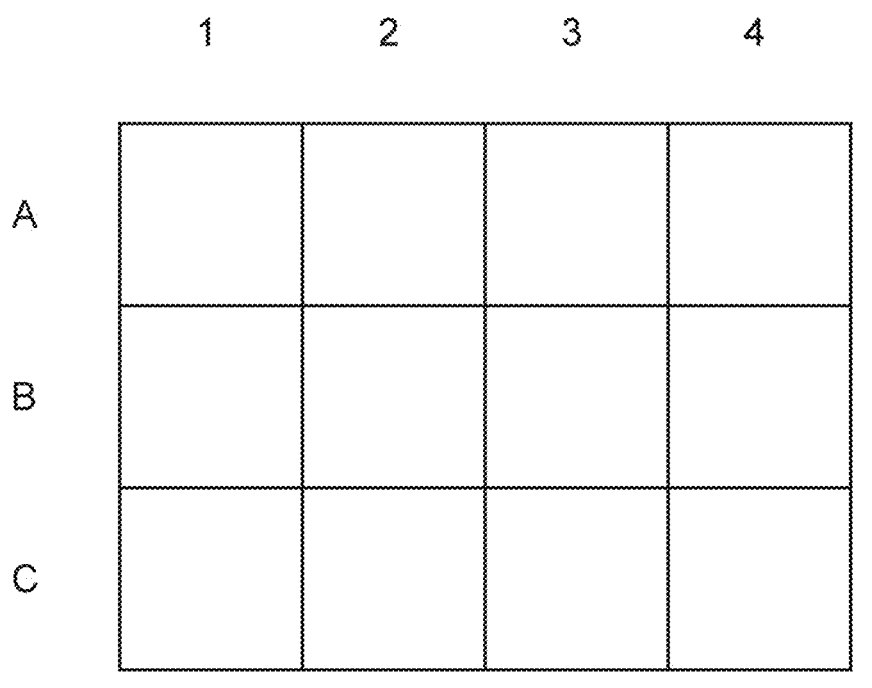

FIG. 2 is a schematic diagram showing arrangement of light emitting blocks in a case that the back light 12 is viewed from the front. The back light 12 includes the plurality of light emitting blocks arranged in a matrix composed of three in a vertical direction (A to C) and four in a horizontal direction (1 to 4). Hereinafter, a position of each light emitting block is represented as a combination of applied numbers in the vertical direction and in the horizontal direction. For example, in FIG. 2, the light emitting block at the upper right is assumed to be a light emitting block A4. Each light emitting block of the back light 12 is controlled by the control unit 100 according to a brightness of a frame displayed in a region of the display panel 11, the region corresponding to each light emitting block.

The control unit 100 is a control circuit which controls the display panel 11 and the back light 12 based on an input frame. For example, the control unit 100 is assumed to be an arithmetic processor such as a CPU (Central Processing Unit) or the like. Details of processing executed by the control unit 100 will be described in detail later. The control unit 100 may be configured with a plurality of arithmetic processors. Further, the control unit 100 may include at least one piece of hardware such as an electronic circuit capable of executing a part of processing to be described later.

The storage unit 200 is a storage medium which stores a program and a parameter for the control unit 100 to execute each processing to be described later and which is readable by the arithmetic processor of the control unit 100. For example, the storage unit 200 is assumed to be a non-volatile storage medium such as a hard disk or the like. The storage unit 200 may include a volatile semiconductor memory. The storage unit 200 is assumed to store data of a frame displayed by the control unit 100 and output the same to the control unit 100 according to a request from the control unit 100.

The operation unit 300 is an interface for inputting a user's instruction to the control unit 100. For example, the operation unit 300 is a part physically operable by a user such as a key board, a mouse, a button, or the like. The operation unit 300 may enable a user's instruction to be input to the control unit 100 through operation of a GUI (Graphical User Interface) displayed on the display module 10. Using the operation unit 300, a user is allowed to input, to the control unit 100, an instruction to execute image processing for confirming a state of an image.

Additionally, the display apparatus 1 is connectable with an imaging apparatus 2 via an input interface provided in the control unit 100. The imaging apparatus 2 is a video output apparatus capable of outputting a frame obtained by the imaging apparatus 2 to the display apparatus 1. The imaging apparatus 2 may be a recording and reproducing apparatus capable of outputting a video signal. Additionally, a user is allowed to operate the imaging apparatus 2 to output, to the control unit 100, an instruction to execute the image processing for confirming a state of an image.

FIG. 3 is a block diagram showing a functional block diagram of the display apparatus 1. The control unit 100 includes an input unit 101, an assist processing unit 102, an amount of light emission determining unit 103, a correcting unit 104, a display control unit 105, and a back light control unit 106.

The input unit 101 obtains a moving picture composed of a plurality of frames from the storage unit 200 or the imaging apparatus 2. For example, a moving picture is assumed to be input, from the imaging apparatus 2, as a video signal converted into a data stream (hereinafter, referred to as an SDI data stream) formed in an SDI transmission format. The input unit 101 converts the input SDI data stream into a form usable by the control unit 100.

The input unit 101 parallelizes an input SDI data stream and descrambles the parallelized SDI data stream. Further, the input unit 101 separates the parallelized SDI data stream after being descrambled to generate a plurality of data streams.

The input unit 101 uses at least one of the plurality of data streams to obtain ancillary data attached to a video signal. The ancillary data is data indicative of a transmission format of input data or properties of a video signal. For example, ancillary data is assumed to be a sampling structure, a pixel depth, a frame rate, a time code including a video frame number, a classification of a signal, a mapping form, and a classification of a link of a video signal, an instruction signal output from the imaging apparatus 2, and the like.

Using at least one of the plurality of data streams, the input unit 101 converts an SDI data stream into a moving picture. For example, using obtained ancillary data, the input unit 101 converts the SDI data stream into a moving picture composed of a plurality of successive frames to be displayed on the display module 10. For example, each frame is assumed to be a video signal with a gradation value indicative of a brightness Y or a color difference Cr, Cb designated by 10 bit data for each of the plurality of pixels arranged in a matrix. The input unit 101 outputs a moving picture composed of a plurality of frames and ancillary data. The plurality of frames of the moving picture obtained by the input unit 101 is assumed to be an input frame. For example, the input unit 101 is assumed to obtain a moving picture of a subject standing still.

Figure 4A:
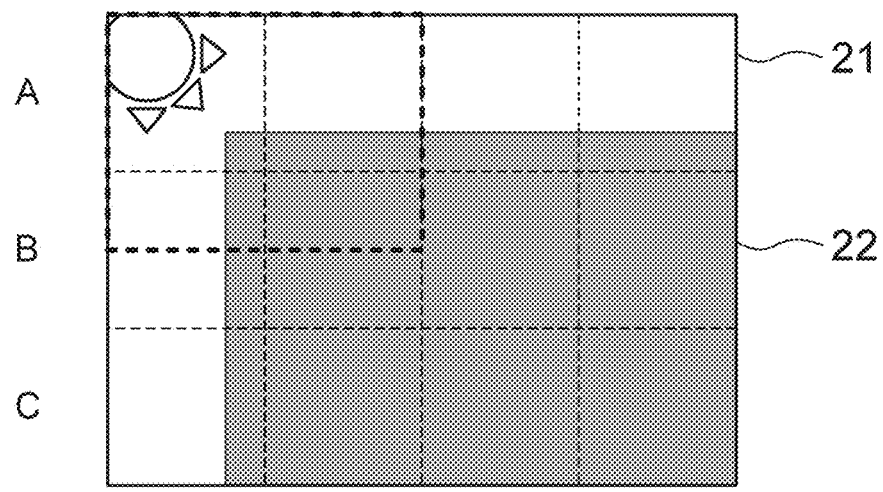
FIGS. 4A and 4B are schematic diagrams showing an image displayed in a frame.
Figure 4B:
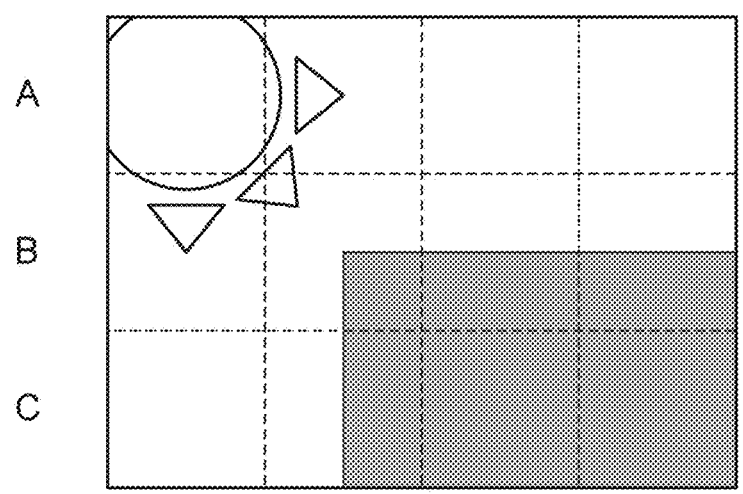

FIGS. 4A and 4B are schematic diagrams showing a certain input frame of an obtained moving picture. FIG. 4A is a schematic diagram showing an input frame 20 converted by the input unit 101. For example, the input frame 20 is assumed to be a frame having a region 21 in which a gradation value indicative of a high brightness is designated, and a region 22 in which a gradation value indicative of a low brightness is designated.

Dotted lines in FIG. 4A each indicate, in a case that an image is displayed on the display panel 11 based on the input frame 20, a position of a corresponding light emitting block. Regions of the input frame 20 corresponding to light emitting blocks A1 to A4, B1 and C1 include a high brightness region. Additionally, the frame 20 corresponding to light emitting blocks B2 to B4, and C2 to C4 is a region composed only of low brightness regions.

The input unit 101 is also capable of obtaining a still image from the imaging apparatus 2 and the storage unit 200 to generate and output a plurality of frames that can be displayed on the display apparatus 1.

The assist processing unit 102 is capable of subjecting an input frame to assist processing to generate and output a display frame. The assist processing unit 102 executes, with respect to an input frame, the assist processing as the image processing for a user to confirm a state of an image according to a user's instruction. The assist processing is assumed to be at least one processing of, for example, enlarging processing, outline enhancement processing, marker synthesizing processing, brightness display processing, zebra display processing, and clipping processing.

The enlarging processing is processing of generating an enlarged frame with a predetermined region thereof enlarged. The outline enhancement processing is processing of detecting an outline region of a frame to execute processing of increasing coloring or a brightness according to an intensity of an outline region. This enables a user to easily confirm an edge in a frame, thereby confirming the degree of focusing of an input video signal.

The marker synthesizing processing is processing of synthesizing a maker which designates an area in a frame. The maker is assumed to be, for example, a white rectangular frame-shaped image indicative of a region included within a predetermined angle of view in a frame. The brightness display processing is processing of converting a gradation value of each pixel so as to be displayed in a predetermined color according to a brightness of each pixel of a frame. The brightness display processing is referred to also as false color processing.

The zebra display processing is processing of synthesizing a striped pattern in a region of a frame, the region having a gradation value not less than a predetermined gradation value. This enables a user to confirm a region of an image, the region having a gradation value not less than a predetermined gradation value. The clipping processing is processing of converting a gradation value of a region having a gradation value larger than a predetermined gradation value to a predetermined gradation value. This enables a user to confirm a region of an image, the region having a gradation value not less than a predetermined gradation value. These processing facilitate user's recognition of, for example, a region of a frame, the region not included in an arbitrarily set range of a gradation value that can be displayed by a display apparatus.

In a case that a user gives an instruction to execute the assist processing, the assist processing unit 102 generates a processed frame obtained by subjecting an input frame to the assist processing and outputs the same as a display frame. Alternatively, in a case that the user fails to give an instruction to execute the assist processing, the assist processing unit 102 outputs the input frame as a display frame. Additionally, the assist processing unit 102 outputs processing information indicating that the assist processing has been executed with respect to a frame.

For example, the assist processing unit 102 is assumed to subject the input frame 20 to the enlarging processing. FIG. 4B is a schematic diagram showing a display frame 30 obtained by executing the enlarging processing with respect to the input frame 20. For example, the assist processing unit 102 is assumed to execute the processing of enlarging a region indicated by a heavy dotted line in FIG. 4A with respect to the input frame 20 to generate the display frame 30. A region of the display frame 30 corresponding to the light emitting blocks A1 to A4, B1 to B4, and C1 and C2 includes a high brightness region. Additionally, a part of the display frame 30 corresponding to the light emitting blocks C3 and C4 is a region composed only of a low brightness region.

The amount of light emission determining unit 103 determines a controlled amount of light emission Bd(N) of each light emitting block of the back light 12 based on a brightness of a display frame N which is displayed N-th. As will be described later, the back light control unit 106 uses the controlled amount of light emission Bd(N) to control light emission of each light emitting block. A magnitude of the controlled amount of light emission Bd(N) of each light emitting block represents a display brightness of a corresponding region of a display frame.

The amount of light emission determining unit 103 individually sets a set amount of light emission Bs(N) for each light emitting block according to a brightness of a region of a display frame, the region corresponding to each light emitting block. Here, in a case that an image is displayed based on the display frame N, the set amount of light emission Bs(N) of each light emitting block set by the amount of light emission determining unit 103 corresponds to a display brightness of a corresponding region in the display frame N.

In a case that the display frame N has been subjected to the assist processing, the amount of light emission determining unit 103 determines the controlled amount of light emission Bd(N) such that a difference between a controlled amount of light emission Bd(N−1) of a display frame N−1 and the controlled amount of light emission Bd(N) of the display frame N is not more than a threshold value. In other words, the amount of light emission determining unit 103 determines the controlled amount of light emission Bd(N−1) such that an amount of a change from a display brightness of the display frame N−1 to a display brightness of the display frame N is not more than a predetermined threshold value. N is assumed to be an integer. Processing of determining the controlled amount of light emission Bd(N) executed by the amount of light emission determining unit 103 will be described later.

The correcting unit 104 corrects the display frame N based on the controlled amount of light emission Bd(N) determined by the amount of light emission determining unit 103. Using a ratio of the controlled amount of light emission Bd(N) determined for each light emitting block to a reference amount of light emission Br, the correcting unit 104 corrects a gradation value of a region in a display frame, the region corresponding to each light emitting block. For example, a gradation value Y of the display frame N after correction is assumed to be represented using a gradation value X of the display frame N before correction and Formula 1.

$$Y = X \times Br/Bd(N)$$

As described above, subjecting the display frame N to the correction processing enables each light emitting block to be controlled by the reference amount of light emission Br, thereby enabling an image to be displayed with a display brightness equivalent to a display brightness in a case where an image is displayed based on the display frame N. The correcting unit 104 outputs the corrected display frame N.

Using the corrected display frame N, the display control unit 105 controls a transmittance of each transmission element of the display panel 11. For example, the display control unit 105 is assumed to control a transmittance of each transmission element by PWM (Pulse Width Modulation) based on the gradation value of the corrected display frame N.

The back light control unit 106 controls light emission of each light emitting block based on the controlled amount of light emission Bd(N) of each light emitting block. For example, the back light control unit 106 is assumed to control a current value flowing to the light source of each light emitting block by PWM based on the controlled amount of light emission Bd(N) of each light emitting block.

Operation of each of the above-described functional blocks results in displaying a moving picture based on a moving picture input to the display module 10.

It is assumed that in a case that a plurality of frames each formed of the same frame as the input frame 20 as shown in FIG. 4A is input, an instruction to execute the assist processing is input by a user at the timing of generation of the display frame N. Specifically, display frames up to the display frame N−1 are the input frames 10 and the display frame N is the processed frame 30 which is obtained by subjecting the input frame 20 to the assist processing. Description will be made of an amount of light emission determination flow of the amount of light emission determining unit 103 in such a case.

Figure 5:
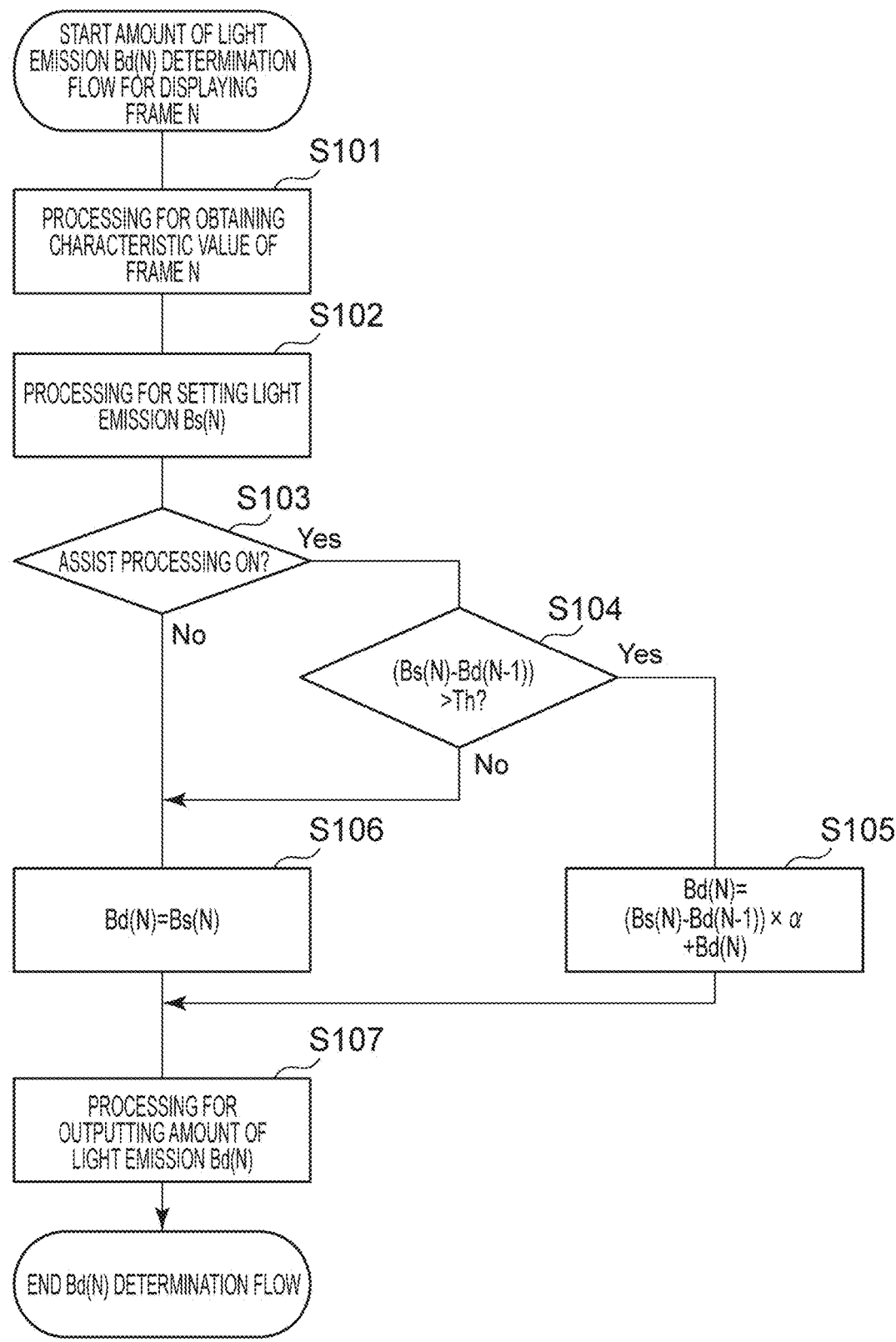
FIG. 5 is a flow chart showing an amount of light emission determination flow executed by an amount of light emission determining unit.

FIG. 5 is a flow chart showing the amount of light emission determination flow executed by the amount of light emission determining unit 103. In a case that the plurality of frames is sequentially displayed, the amount of light emission determining unit 103 executes the amount of light emission determination flow for each display frame. In a case that the amount of light emission determination flow is started, the processing proceeds to S101.

At S101, the amount of light emission determining unit 103 executes processing of obtaining a characteristic value of the display frame N. The characteristic value is obtained for a region of the display frame N, the region corresponding to each light emitting block of the back light. For example, the characteristic value is assumed to be a maximum value of a gradation value in a region of the display frame N, the region corresponding to each light emitting block. The characteristic value represents a display brightness of a region in the display frame N, the region corresponding to each light emitting block. For example, the characteristic value can be also an average value or a central value of a gradation value in a region of the display frame N, the region corresponding to each light emitting block. The processing proceeds to S102.

Figure 6:
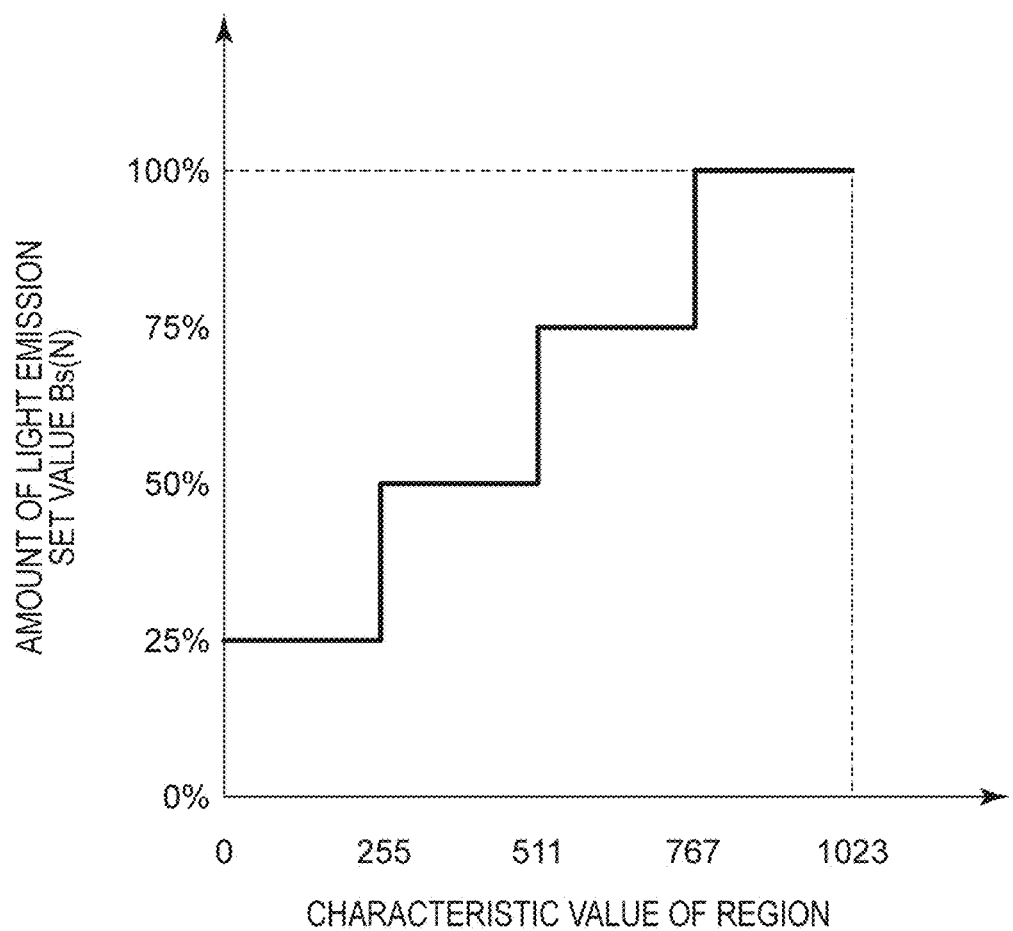
FIG. 6 is a schematic diagram showing a relation between a characteristic value and a set value of an amount of light emission.

At S102, the amount of light emission determining unit 103 sets the set amount of light emission Bs(N) for each light emitting block based on the obtained characteristic value of the region in the display frame N, the region corresponding to each light emitting block. FIG. 6 is a schematic diagram showing a relation between a characteristic value and the set amount of light emission Bs(N). For example, it is assumed that in a case that the characteristic value (maximum gradation value) of the region in the display frame N, the region corresponding to a light emitting block, is more than 255 and not more than 511, the amount of light emission determining unit 103 sets the set amount of light emission Bs(N) of the light emitting block to be 50%.

The set amount of light emission Bs(N) is assumed to be represented as a ratio to the reference amount of light emission Br set in advance for a light emitting block. The reference amount of light emission Br may be a fixed value which is set in advance, or, for example, may be determined according to a maximum value of a brightness displayed on the display module 10 set by a user.

FIGS. 7A and 7B are schematic diagrams showing a set amount of light emission Bs(N) which is set based on the input frame 20 or the processed frame 30. FIG. 7A is a schematic diagram showing a set amount of light emission Bs(N−1) which is set based on the input frame 20. Based on a relation between a characteristic value and a set value of an amount of light emission shown in FIG. 6, the set amount of light emission Bs(N−1) for each of the light emitting blocks A1 to A4, B1, and C1 is set to be 100%, and the set amount of light emission Bs(N−1) for each of the remainder light emitting blocks is set to be 25%.

For example, assuming the display frame (N−1) to be the input frame 20, each light emitting block of the back light 12 at the time of displaying the display frame (N−1) has light emission thereof controlled with the set amount of light emission Bs(N−1) shown in FIG. 7A set as the controlled amount of light emission Bd(N−1).

FIG. 7B is a schematic diagram showing the set amount of light emission Bs(N) which is set based on the processed frame 30. Based on the relation between a characteristic value and a set value of a set amount of light emission shown in FIG. 6, the set amount of light emission Bs(N) for each of the light emitting blocks A1 to A4, B1 to B4, and C1 and C2 is set to be 100%, and the set amount of light emission Bs(N) of each of the remainder light emitting blocks is set to be 25%. The processing proceeds to S103.

At S103, the amount of light emission determining unit 103 determines whether the display frame N is an input frame subjected to the assist processing or not based on processing information output by the assist processing unit 102. In a case that the display frame N is an input frame subjected to the assist processing, the processing proceeds to S104. Alternatively, in a case that the display frame N is an input frame not subjected to the assist processing, the processing proceeds to S106. Specifically, in a case that the display frame N has not been subjected to the assist processing, the amount of light emission determining unit 103 fails to execute adjustment processing of an amount of light emission at S104 and the following steps. In other words, in a case that the display frame N has not been subjected to the assist processing, a display brightness of the display frame N is allowed to be increased.

At S104, the amount of light emission determining unit 103 determines whether a difference in an amount of light emission between the set amount of light emission Bs(N) set for each light emitting block based on the display frame N and the controlled amount of light emission Bd(N−1) used for displaying the display frame N−1 is larger than a threshold value Th or not. For example, the threshold value Th is assumed to be 25%.

A light emitting block having a difference in an amount of light emission larger than the threshold value Th is considered to have a large display brightness change in a region corresponding to the light emitting block due to switching from the display frame N−1 to the display frame N. Accordingly, it can be also said that determination is made at S104 whether an amount of change from a display brightness of the display frame N−1 to a display brightness of the display frame N is larger than a predetermined threshold value or not.

In a case where the amount of change from the display brightness of the display frame N−1 to the display brightness of the display frame N is large, in a case that a user is paying an attention to a screen including the region in question in order to confirm a state of an image, the user may feel a glare due to a sharp increase in brightness in some cases.

In a case that at least one light emitting block is present which has a difference in an amount of light emission between the set amount of light emission Bs(N) and the controlled amount of light emission Bd(N−1) larger than the threshold value Th, the processing proceeds to S105. Alternatively, in a case that in all the light emitting blocks, a difference in an amount of light emission is not more than the threshold value Th, the processing proceeds to S106.

At S105, the amount of light emission determining unit 103 determines the controlled amount of light emission Bd(N) for each light emitting block such that an amount of change from the controlled amount of light emission Bd(N−1) to the controlled amount of light emission Bd(N) is not more than the threshold value Th. For example, determination of the controlled amount of light emission Bd(N) is assumed to be made by adding, to the controlled amount of light emission Bd(N−1), a value obtained by multiplying a difference between the set amount of light emission Bs(N) and the controlled amount of light emission Bd(N−1) by a correction coefficient α smaller than 1. The correction coefficient α is assumed to be 0.3. The amount of light emission determining unit 103 may determine a value obtained by adding the threshold value Th to the controlled amount of light emission Bd(N−1) as the controlled amount of light emission Bd(N).

At S106, the amount of light emission determining unit 103 determines the set amount of light emission Bs(N) as the controlled amount of light emission Bd(N) for each light emitting block. The processing proceeds to S107.

At S107, the amount of light emission determining unit 103 executes processing of outputting the controlled amount of light emission Bd(N) determined for each light emitting block. Upon completion of the processing of S107, the set amount of light emission Bd(N) determination flow ends.

Figure 8:
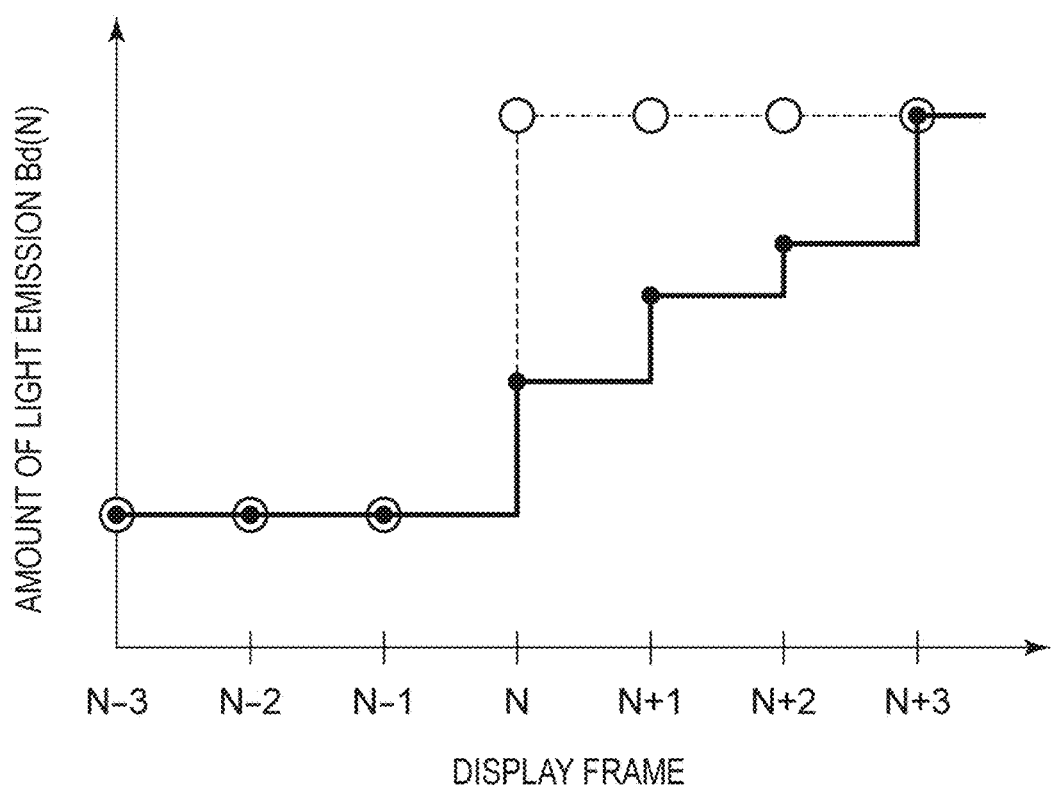
FIG. 8 is a schematic diagram showing an amount of light emission determined for an M-th display frame by the amount of light emission determining unit.

FIG. 8 is a schematic diagram showing a controlled amount of light emission Bd(M) of the light emitting block B2 of the back light, the amount being determined for an M-th display frame M by the amount of light emission determining unit 103. The horizontal axis represents a number of a display frame and the vertical axis represents a controlled amount of light emission Bd(M).

Black dots in FIG. 8 each represent a controlled amount of light emission Bd(M) determined based on the above determination flow. Additionally, white dots in FIG. 8 each represent a controlled amount of light emission Bd(M), for comparison, in a case that a set amount of light emission Bs(M) which is set according to a characteristic value of the display frame M is used as the controlled amount of light emission Bd(M).

For example, it is assumed that at timing of the display frame N, an instruction is given to execute the assist processing. In this case, each display frame up to the display frame N−1 is a frame corresponding to the input frame 20 not subjected to the assist processing and each display frame after the display frame N is the frame corresponding to the input frame 20 subjected to the assist processing.

Since the display frame N has been subjected to the assist processing, the amount of light emission determining unit 103 compares the controlled amount of light emission Bd(N−1) of the display frame N−1 with the set amount of light emission Bs(N) of the display frame N. For example, in FIG. 8, assuming that the controlled amount of light emission Bd(N−1) of the display frame N−1 is 25%, and the set amount of light emission Bs(N) of the display frame N is 100%, a difference between these amounts is 75%, which is larger than the threshold value Th (25%).

Accordingly, the amount of light emission determining unit 103 determines, as the controlled amount of light emission Bd(N), 50% which is obtained by adding, to the controlled amount of light emission Bd(N−1) 25%, a value obtained by multiplying the difference 75% (100%−25%) between the controlled amount of light emission Bd(N−1) and the set amount of light emission Bs(N) by the correction coefficient α (=0.3).

With respect to the display frames subsequent to N+1, the amount of light emission determining unit 103 similarly executes the amount of light emission determination processing. As shown in FIG. 8, execution of the above flow for each display frame enables display with a delay in a change of a display brightness, the change being caused by a change in a brightness of the display frame.

In a case that a brightness difference between a display brightness of the display frame N−1 and a display brightness of the display frame N subjected to the assist processing is larger than a predetermined threshold value as a result of execution of the above amount of light emission determination flow, the display frame N is displayed on the display module 10 so as to have the brightness difference reduced. Accordingly, in a case that a user executes the assist processing for confirming a state of an image, the user can be suppressed from feeling a glare due to an abrupt change in brightness of the display frame.

The method of determining, at S104 of the amount of light emission determination flow, whether an increase in brightness in a case that the display frame N−1 is switched to the display frame N is large or not can be other determination method than the above method. For example, the amount of light emission determining unit 103 can also determine that an increase in brightness at switching from the display frame N−1 to the display frame N is large in a case that a difference between an average gradation value of the display frame N and an average gradation value of the display frame N−1 is larger than the threshold value.

Alternatively, the above amount of light emission determination flow may be executed for each region corresponding to each light emitting block. Specifically, the controlled amount of light emission Bd(N−1) and the set amount of light emission Bs(N) can be compared for each light emitting block to switch a determination method of the controlled amount of light emission Bd(N) of the light emitting block.

In the present Example, although the description has been made of control to be executed at the time of switching from the display frame N−1 not subjected to the assist processing to the display frame N subjected to the assist processing, the display frame N−1 may have been subjected to the assist processing. For example, even in a case that in a state where an input moving picture is subjected to the assist processing and displayed by the display apparatus 1, a display brightness largely changes between the display frame N−1 and the display frame N due to control of the imaging apparatus 2, the control recited in the present Example can be executed. In a state where the input moving picture is subjected to the assist processing and displayed by the display apparatus 1, so that it is highly probable that the user is gazing at a screen, execution of the control in the present Example enables the user to suitably confirm an image.

Alternatively, the display apparatus 1 may control a display brightness of each image by the above method in a case of switching and displaying a plurality of images. For example, in a case that a display image to be displayed on the display module 10 has been subjected to the assist processing, the control unit 100 controls the display module 10 such that a difference between a display brightness of an image displayed before the display image and a display brightness of the display image is not more than the threshold value.

Even in a case that the display module 10 is a self-light emitting type display module other than a display module including the transmission type display panel 11 and the back light 12, the display module is allowed to execute the above control. For example, the display module may be an organic EL display using an organic EL (Electro Luminescence) element as an element.

An organic EL display is PWM-controlled by a drive current according to a peak brightness of a display frame based on a gradation value of a pixel corresponding to each organic EL element to display an image. For example, it is assumed that in a case that a difference between a display brightness of the display frame N−1 and a display brightness of the display frame N subjected to the assist processing is larger than a threshold value Th2, the control unit 100 suppresses a change from a drive current of the display frame N−1 to a drive current of the display frame N. Control for the above organic EL display may be executed with respect to the entire screen of the organic EL display or can be individually executed with respect to a plurality of regions forming the screen.

The display apparatus 1 may operate in an operation mode selected by a user among a plurality of operation modes. The plurality of operation modes includes a first operation mode in which an abrupt increase in brightness of a display frame subjected to the assist processing as described above is suppressed, and a second operation mode true to a brightness of a display frame even subjected to the assist processing (an increase in display brightness is not suppressed).

Second Example

The display apparatus recited in the First Example controls a change in display brightness between frames according to whether the display apparatus 1 executes the assist processing with respect to an input frame or not. A display apparatus 1 in the Second Example controls a change in display brightness between frames according to whether an image output apparatus which outputs an input frame has executed the assist processing with respect to an input frame or not. Specifically, in a case of obtaining information indicating that an input frame N has been subjected to the assist processing from the image output apparatus, the display apparatus 1 controls the display module 10 such that a difference between a display brightness of an input frame N−1 and a display brightness of the input frame N is not more than a predetermined threshold value.

Since an apparatus configuration of the display apparatus 1 and a functional block of the control unit 100 in the Second Example are the same as those of the First Example, no detailed description will be made thereof. In the Second Example, description will be made of functional blocks operable differently from the First Example.

Figure 9:
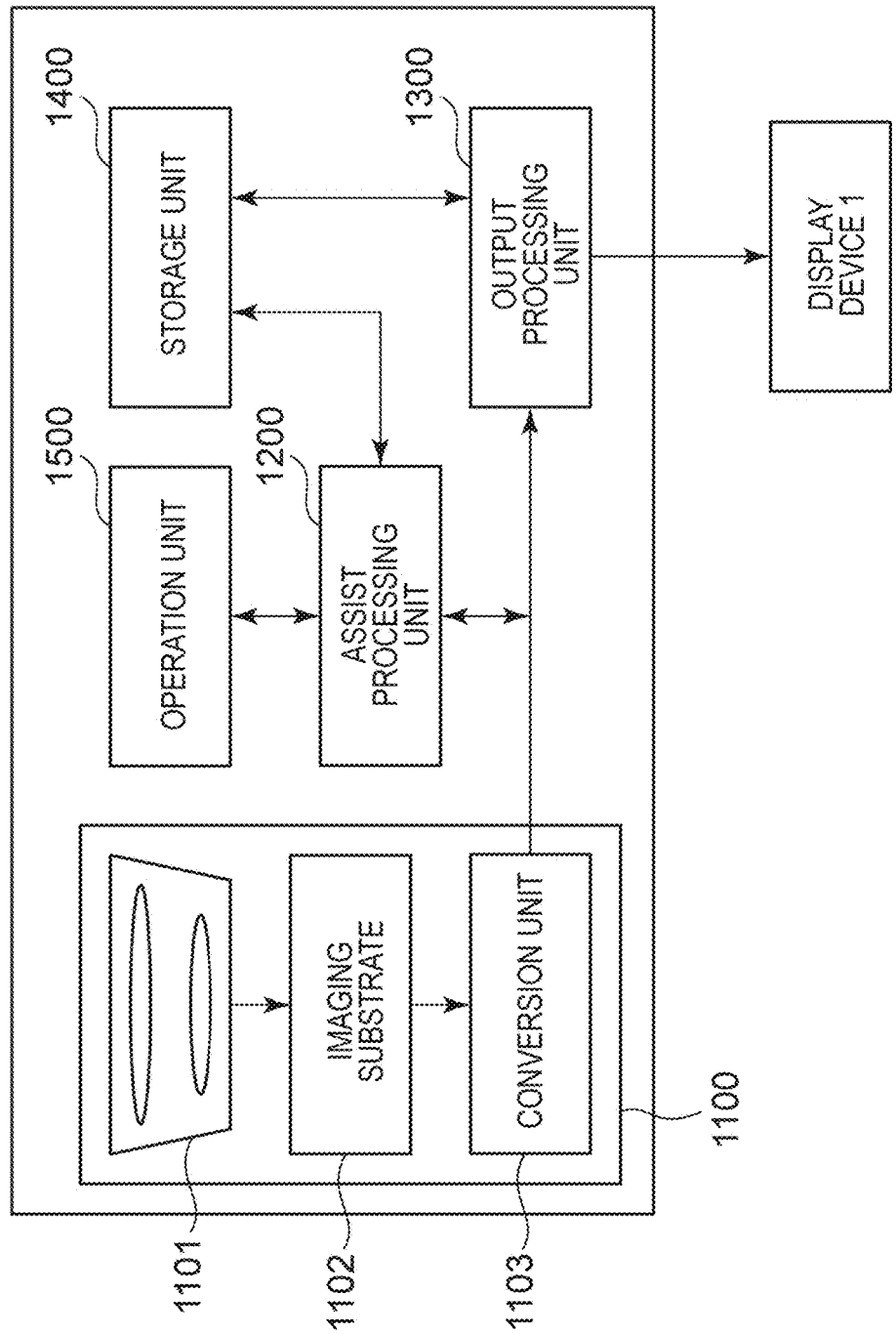
FIG. 9 is a view of an apparatus configuration of an imaging apparatus.

FIG. 9 is a view of an apparatus configuration of an imaging apparatus 2. The imaging apparatus 2 includes an imaging unit 1100, an assist processing unit 1200, an output processing unit 1300, a storage unit 1400, and an operation unit 1500. The imaging apparatus 2 is an image output apparatus capable of outputting a frame based on an image obtained by the imaging unit 1100. The imaging apparatus 2 may be a video output apparatus capable of externally outputting video signals accumulated in the storage unit 1400. The imaging apparatus 2, which is connectable with the display apparatus 1, outputs an SDI data stream converted from a video signal from the output processing unit 1300 to the display apparatus 1.

The imaging unit 1100 photographs a subject to output an obtained video signal. The imaging unit 1100 includes a plurality of lenses 1101 to which a light is input, an imaging substrate 1102, and a conversion unit 1103. The imaging substrate 1102 has imaging elements arranged in a matrix, the imaging elements converting an input light into an analog signal. The conversion unit 1103 outputs a frame periodically converted from an analog signal output from the imaging substrate 1102 into a digital signal at a frame rate set in advance.

The assist processing unit 1200 is an arithmetic processing substrate capable of executing the assist processing with respect to an obtained video signal. For example, the assist processing unit 1200 is assumed to be a CPU capable of executing the assist processing with respect to a frame by executing a program read from the storage unit 1400 according to an instruction input by a user using the operation unit 1500.

The output processing unit 1300 is a circuit substrate which converts a frame output from imaging unit 1100 or the assist processing unit 1200 into a data stream formed in an SDI transmission format (hereinafter referred to as an SDI data stream) and outputs the data stream. For example, the output processing unit 1300 is assumed to include an arithmetic processor such as a CPU or the like, and hardware such as an electronic circuit or the like.

The output processing unit 1300 maps an obtained video signal and ancillary data to a data stream and multiplexes the generated data stream to generate an SDI data stream. Additionally, the output processing unit 1300 conducts scrambling of an SDI data stream. The output processing unit 1300 conducts parallel-serial conversion of the SDI data stream to output a serialized SDI data stream.

Ancillary data mapped by the output processing unit 1300 to a data stream includes information indicative of whether the assist processing unit 1200 executes the assist processing with respect to a frame output from the imaging unit 1100 or not.

The storage unit 1400 is a storage medium which stores a program or a parameter executed by the assist processing unit 1200 and the output processing unit 1300 and is readable by the arithmetic processor. For example, the storage unit 1400 is assumed to be a non-volatile storage medium such as a hard disk. The storage unit 1400 may include a volatile semiconductor memory.

The operation unit 1500 is an interface for inputting a user's instruction indicating whether to execute the assist processing with respect to a frame output from the imaging unit 1100 or not.

The imaging apparatus 2 outputs, to the display apparatus 1, an SDI data stream with a frame obtained by photographing a subject and information superposed, the information indicating whether the assist processing has been executed with respect to the frame or not.

The control unit 100 of the display apparatus 1 controls the display module 10 such that an image is displayed on the display module 10 based on an obtained SDI data stream. The input unit 101 obtains, from the input SDI data stream, the frame obtained by photographing the subject, and ancillary data including information indicating whether the assist processing has been executed with respect to the frame or not. The control unit 100 determines the obtained frame as the display frame N.

The amount of light emission determining unit 103 determines whether the display frame N is a frame having been subjected to the assist processing or not based on the information indicating whether the assist processing has been executed with respect to the input frame or not. In a case that the display frame N has been subjected to the assist processing, the amount of light emission determining unit 103 compares the controlled amount of light emission Bd(N−1) determined for the display frame N−1 and the set amount of light emission Bs(N) based on the display frame N similarly to the First Example.

In a case that a difference between the controlled amount of light emission Bd(N−1) and the set amount of light emission Bs(N) is larger than the threshold value Th, the amount of light emission determining unit 103 controls the display module 10 such that a difference between a display brightness of the display frame N−1 and a display brightness of the display frame N becomes small. Specifically, the amount of light emission determining unit 103 determines an amount of light emission of each light emitting block in the back light 12 based on the determination flow of the controlled amount of light emission Bd(N) recited in the First Example.

In a case of displaying an image based on the display frame N having been subjected to the assist processing by the imaging apparatus 2, the display apparatus 1 according to the Second Example enables light emission to be controlled with a more delay in an increase in an amount of light emission between frames than in a case where an amount of light emission is determined based on a characteristic value of the display frame N. Accordingly, in a case that a user executes the assist processing for confirming a state of an image, the user can be suppressed from feeling a glare caused by an abrupt change in brightness of the display frame.

In a case of executing recording operation of recording an obtained frame in the storage unit 1400 according to a user's instruction, the imaging apparatus 2 is also allowed to superpose information indicating that recording is being executed on an SDI data stream and output the obtained result. In a case of obtaining information indicating that the imaging apparatus 2 is executing the recording operation, the control unit 100 of the display apparatus 1 refrains from executing the above control to suppress an increase in an amount of light emission between frames. In a case that the imaging apparatus 2 is executing the recording operation, this enables a user to confirm a video recorded by the display apparatus 1 without a delay. This is also the case with reproduction, by the imaging apparatus 2, of a video recorded on the storage unit 1400. In other words, it can be said that in a case of obtaining information indicating that the imaging apparatus 2 is executing at least one of operations, recording and reproduction of a video, the control unit 100 refrains from executing control for reducing an increase in an amount of the controlled amount of light emission Bd(N) with respect to the display frame N.

Third Example

The display apparatuses recited in the First and Second Examples control an increase in a light emission brightness of the back light to control a change of a display brightness between frames according to whether a display frame has been subjected to the assist processing or not. In a case that a brightness of a display frame subjected to the assist processing is higher than a brightness of an immediately preceding display frame by a predetermined threshold value, the display apparatus 1 in the Third Example executes processing of reducing the brightness of the display frame having been subjected to the assist processing. Specifically, in a case of displaying an image based on the display frame N having been subjected to the assist processing, the display apparatus 1 controls the display module 10 such that a difference between a display brightness of the display frame N−1 and a display brightness of the display frame N is not more than a predetermined threshold value.

A display apparatus 301 of the Third Example includes a display module 310, a control unit 400, and a memory 500. The display module 310 includes a liquid crystal panel 311 and a back light 312. The display module 310 exhibits the same functions as in the First and Second Examples. Detailed description of the display module 310 is omitted.

Figure 10:
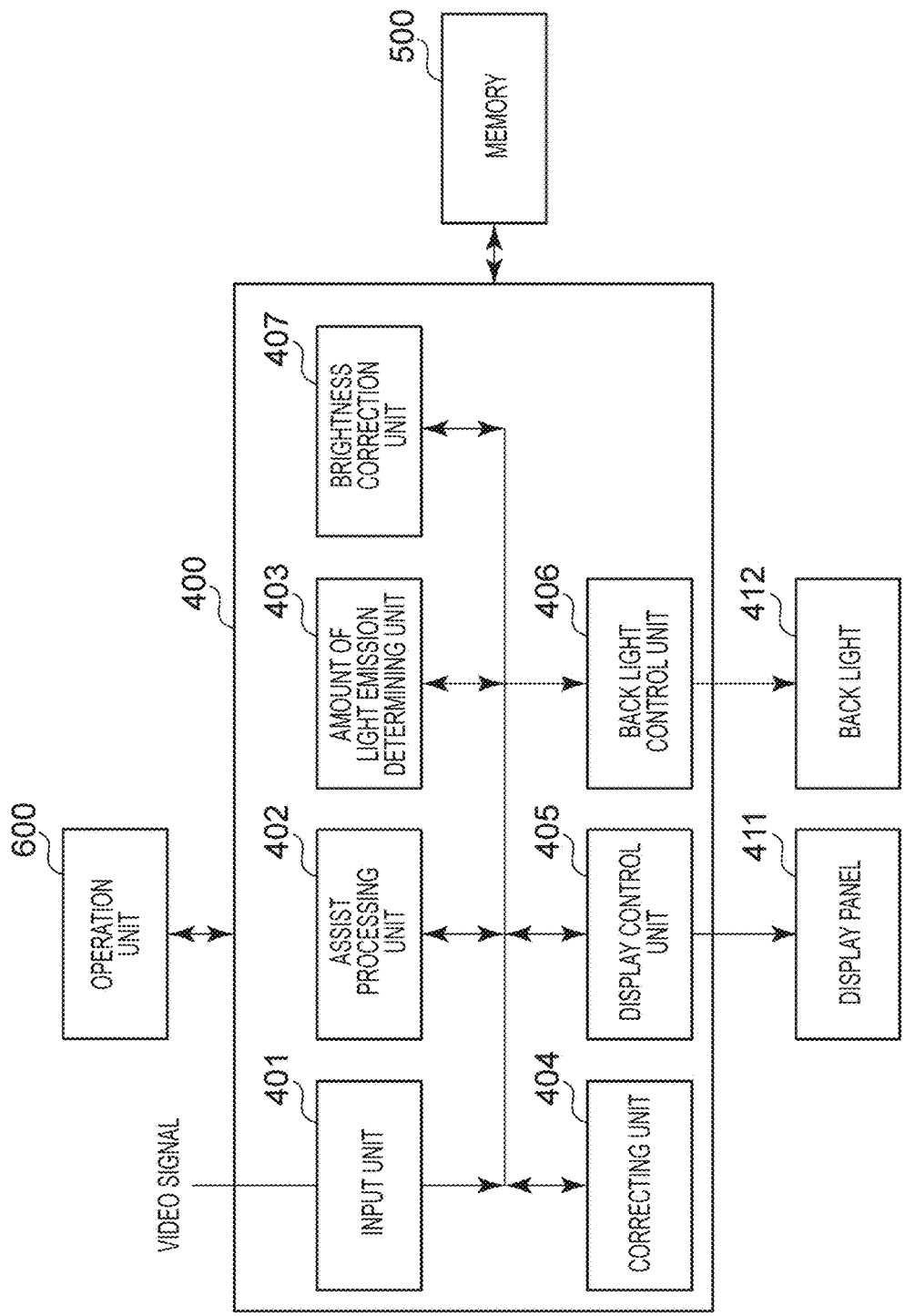
FIG. 10 is a second block diagram showing a functional block diagram of the display apparatus.

FIG. 10 is a block diagram showing a functional block of the control unit 400. The control unit 400 includes an input unit 401, an assist processing unit 402, an amount of light emission determining unit 103, a correcting unit 404, a display control unit 405, a back light control unit 406, and a brightness correction unit 407. Since respective functional blocks other than an amount of light emission determining unit 403 and the brightness correction unit 407 exhibit the same functions as in the First and Second Examples, no description will be made thereof.

In a case that a display frame N is a frame subjected to the assist processing, the brightness correction unit 407 corrects a brightness of the display frame N such that a change of a display brightness at the switching of display from the display frame N−1 to the display frame N is not more than a threshold value. Specifically, the brightness correction unit 407 executes processing of reducing a pixel level of the display frame N according to a brightness of the display frame N−1 and a threshold value.

For example, the brightness correction unit 407 is assumed to obtain an APL (Average of Pixel Level) as a brightness of the display frame N. The brightness of the display frame N may be a maximum value or a central value of a pixel level. In a case that a pixel level is designated for each color of RGB of pixels in a frame, statics of any one of values of a pixel level with respect to any one color may be used, the values including an average value, a maximum value, and a central value.

The brightness correction unit 407 determines whether a ratio of an APL of the display frame N to an APL of the display frame N−1 is not more than a threshold value P or not. In a case that determination is made that the ratio of the APL of the display frame N to the APL of the display frame N−1 is more than the threshold value P, the brightness correction unit 407 multiplies each pixel level of the display frame N by a correction value which is obtained by dividing the threshold value P by the ratio of the APL of the display frame N to the APL of the display frame N−1. The brightness correction unit 407 outputs the display frame N having been subjected to the above processing to the amount of light emission determining unit 403 and to the correcting unit 404.

Based on the frame output from the brightness correction unit 407, the amount of light emission determining unit 403 determines a brightness of each light source in the back light, the brightness at timing of displaying the frame.

The above processing enables the display frame N having been subjected to the assist processing to be displayed with a display brightness with which a change of a display brightness from the immediately preceding display frame N−1 is not more than the threshold value. Accordingly, it is possible to suppress an abrupt change in a display brightness between frames.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-123933, filed Jun. 22, 2016, which is hereby incorporated by reference herein in its entirety.

What is claimed is:

1. A display apparatus comprising:
   a display unit configured to sequentially display a plurality of images based on a plurality of frames including a first frame and a second frame; and
   a control unit configured to control the display unit so as to display each frame with a display brightness according to a brightness of each frame,
   wherein in a case that the second frame is to be subjected to predetermined image processing, the control unit performs controlling the display unit such that an amount of change from a display brightness of the first frame to a display brightness of the second frame is not more than a predetermined threshold value, and in a case that the second frame is not to be subjected to predetermined image processing, the control unit does not perform the controlling,
   wherein the predetermined image processing is at least one of enlarging processing, outline enhancement processing, marker synthesizing processing, zebra display processing, and clipping processing.

2. The display apparatus according to claim 1, further comprising an image processing unit for subjecting at least the second frame to the predetermined image processing.

3. The display apparatus according to claim 1, wherein
   the display apparatus is connectable with an image output apparatus including an image processing unit for subjecting the plurality of frames to the predetermined image processing, and an output unit which outputs the plurality of frames, and
   comprises an obtaining unit which obtains, from the image output apparatus, the plurality of frames and processing information indicating whether an obtained frame has been subjected to the predetermined image processing or not, and
   the control unit determines whether the second frame has been subjected to the predetermined image processing or not based on the processing information.

4. The display apparatus according to claim 1, wherein
   the display unit has a screen which displays an image formed of a plurality of regions, and
   in a case that the second frame has been subjected to the predetermined image processing, the control unit controls the display unit such that with respect to each of the plurality of regions, an amount of change from a display brightness of the first frame to a display brightness of the second frame is not more than a predetermined threshold value.

5. The display apparatus according to claim 1, which controls the display unit such that in a case that the second frame has been subjected to the predetermined image processing, a difference between a first brightness displayed in the display unit in a case that the first frame is displayed and a second brightness displayed in the display unit in a case that the second frame is displayed is not more than a predetermined threshold value.

6. The display apparatus according to claim 5, wherein the display unit comprises:
   a display panel configured to transmit a light to display an image;
   a plurality of light emission units configured to radiate a light to the display panel; and
   a setting unit configured to set an amount of light emission according to a characteristic value indicative of a brightness of a frame displayed in a region of the display panel, the region corresponding to each light emission unit, wherein in a case that the second frame has been subjected to the predetermined image processing, the setting unit sets an amount of light emission based on the characteristic value of the second frame such that a difference between the first brightness and the second brightness is not more than a predetermined threshold value.

7. The display apparatus according to claim 6, wherein in a case that the second frame has been subjected to the predetermined image processing, and a difference in an amount of light emission between a first amount of light emission set based on a brightness of the first frame and a second amount of light emission set based on a brightness of the second frame is larger than a light emission amount threshold value corresponding to the predetermined threshold value, the setting unit sets an amount of light emission with which a difference from the first amount of light emission is not more than the light emission amount threshold value.

8. The display apparatus according to claim 7, wherein in a case that the second frame has been subjected to the predetermined image processing, and a difference in an amount of light emission between a first amount of light emission set based on a brightness of the first frame and a second amount of light emission set based on a brightness of the second frame is larger than the predetermined threshold value, the control unit obtains an amount of light emission of the light emission unit in a case that the second frame is displayed by adding, to the first amount of light emission, a value obtained by multiplying a difference between the first amount of light emission and the second amount of light emission by a correction coefficient smaller than 1.

9. The display apparatus according to claim 5, wherein the display unit is a self-light emitting type display panel capable of controlling a display brightness according to a drive current, and the control unit is capable of controlling the display unit by a drive current according to a brightness of a frame displayed in the display unit, and in a case that the second frame has been subjected to the predetermined image processing, and a difference between the first brightness and the second brightness is larger than the predetermined threshold value, the control unit controls the display unit such that the second frame is displayed by a drive current smaller than the drive current based on the second frame.

10. The display apparatus according to claim 3, wherein the image output apparatus is executing at least one of operations of recording and reproducing a video according to each frame, and in a case that the control unit obtains, from the image output apparatus, information indicating that the image output apparatus is executing at least one of operations of recording and reproducing an image according to each frame, the control unit refrains from executing control such that an amount of change from a display brightness of the first frame to a display brightness of the second frame is not more than the predetermined threshold value.

11. A control method of a display apparatus configured to sequentially display a plurality of images based on a plurality of frames including a first frame and a second frame, the method comprising:

displaying an image based on the second frame after displaying an image based on the first frame; and in a case that the second frame has been subjected to predetermined image processing, controlling the display apparatus such that an amount of change from a display brightness of the first frame to a display brightness of the second frame is not more than a predetermined threshold value, wherein the predetermined image processing is at least one of enlarging processing, outline enhancement processing, marker synthesizing processing zebra display processing, and clipping processing.

12. The control method according to claim 11, further comprising:

transmitting a light to display an image by a display panel;
radiating a light to the display panel; and
setting an amount of light emission according to a characteristic value indicative of a brightness of a frame displayed in a region of the display panel, wherein in a case that the second frame has been subjected to the predetermined image processing, the setting sets an amount of light emission based on the characteristic value of the second frame such that a difference between the first brightness and the second brightness is not more than a predetermined threshold value.

13. A non-transitory computer-readable storage medium which stores a program to be executed by a computer to cause a display apparatus to conduct steps of, the display apparatus being configured to sequentially display a plurality of images based on a plurality of frames including a first frame and a second frame:

displaying an image based on the second frame after displaying an image based on the first frame; and in a case that the second frame has been subjected to predetermined image processing, controlling the display apparatus such that an amount of change from a display brightness of the first frame to a display brightness of the second frame is not more than a predetermined threshold value, wherein the predetermined image processing is at least one of enlarging processing, outline enhancement processing, marker synthesizing processing zebra display processing, and clipping processing.

* * * * *